(12) United States Patent
Le Maitre et al.

(10) Patent No.: US 12,140,799 B2
(45) Date of Patent: Nov. 12, 2024

(54) ELECTRO-OPTICAL DEVICE WITH RING RESONATOR

(71) Applicant: STMicroelectronics (Crolles 2) SAS, Crolles (FR)

(72) Inventors: Patrick Le Maitre, Biviers (FR); Nicolas Michit, Grenoble (FR)

(73) Assignee: STMicroelectronics (Crolles 2) SAS, Crolles (FR)

( * ) Notice: Subject to any disclaimer, the term of this patent is extended or adjusted under 35 U.S.C. 154(b) by 387 days.

(21) Appl. No.: 17/476,152

(22) Filed: Sep. 15, 2021

(65) Prior Publication Data

US 2022/0003932 A1 Jan. 6, 2022

Related U.S. Application Data

(63) Continuation of application No. 16/702,960, filed on Dec. 4, 2019, now Pat. No. 11,125,946.

(30) Foreign Application Priority Data

Dec. 20, 2018 (FR) ..................................... 1873574

(51) Int. Cl.
*G02B 6/293* (2006.01)
*G02B 6/12* (2006.01)
*G02F 1/225* (2006.01)

(52) U.S. Cl.
CPC ....... *G02B 6/2934* (2013.01); *G02B 6/12007* (2013.01); *G02F 1/225* (2013.01); *G02B 2006/12061* (2013.01); *G02F 2203/15* (2013.01)

(58) Field of Classification Search
None
See application file for complete search history.

(56) References Cited

U.S. PATENT DOCUMENTS

| | | | |
|---|---|---|---|
| 6,400,856 B1 | 6/2002 | Chin | |
| 6,411,752 B1 | 6/2002 | Little et al. | |
| 7,941,014 B1 | 5/2011 | Watts et al. | |
| 2007/0071394 A1 | 3/2007 | Faccio et al. | |
| 2008/0101744 A1 | 5/2008 | Keyser et al. | |
| 2011/0293216 A1* | 12/2011 | Lipson | G02B 6/13 438/31 |
| 2015/0316795 A1* | 11/2015 | Hui | G02F 1/3133 438/23 |
| 2016/0209593 A1 | 7/2016 | Jiang | |
| 2016/0327743 A1 | 11/2016 | Kippenberg et al. | |
| 2016/0357035 A1 | 12/2016 | Kamei et al. | |
| 2016/0380408 A1 | 12/2016 | Zhang et al. | |
| 2018/0307118 A1* | 10/2018 | Sciancalepore | G02F 1/3536 |
| 2020/0200974 A1 | 6/2020 | Le Maitre et al. | |

FOREIGN PATENT DOCUMENTS

| | | |
|---|---|---|
| CN | 1886686 A | 12/2006 |
| CN | 211236499 U | 8/2020 |
| EP | 1918695 A1 | 5/2008 |
| WO | 0122139 A9 | 10/2002 |

* cited by examiner

*Primary Examiner* — Chad H Smith
(74) *Attorney, Agent, or Firm* — Slater Matsil, LLP

(57) ABSTRACT

A ring resonator electro-optical device includes a first silicon nitride waveguide and a second annular silicon waveguide that comprises a first section running under a second section of the first waveguide. The second waveguide also includes an annular silicon strip having a cross-section increasing in the first section from a minimum cross-section located under the second section.

22 Claims, 6 Drawing Sheets

ELECTRO-OPTICAL DEVICE WITH RING RESONATOR

CROSS-REFERENCE TO RELATED APPLICATIONS

This application is a continuation of U.S. patent application Ser. No. 16/702,960, filed Dec. 4, 2019, which application claims priority to French Patent Application No. 1873574, filed on Dec. 20, 2018, which applications are hereby incorporated herein by reference.

TECHNICAL FIELD

The present disclosure relates to an electro-optical device with a ring resonator.

BACKGROUND

In an integrated photonic circuit, ring resonator electro-optical devices are currently used to transmit data via a light signal. Such ring resonator devices are for example electro-optical switches or electro-optical modulators.

SUMMARY

The present disclosure generally relates to integrated photonic circuits comprising electro-optical devices. Particular embodiments relate to electro-optical devices provided with at least one annular resonant waveguide, also called ring resonator electro-optical devices.

Embodiments provide a ring resonator electro-optical device that overcomes all or part of the disadvantages of known ring resonator electro-optical devices. For example, embodiments provide a ring resonator electro-optical device comprising an annular silicon waveguide optically coupled to a silicon nitride waveguide that can overcome disadvantages of known ring resonator electro-optical devices.

Thus, an embodiment provides a ring resonator electro-optical device that comprises a first silicon nitride waveguide and a second annular silicon waveguide. The second waveguide comprises a first section running under a second section of the first waveguide. The second waveguide comprises an annular silicon strip having a cross-section increasing in the first section from a minimum cross-section located under the second section.

According to an embodiment, the second section is rectilinear, the minimum cross-section being preferably substantially orthogonal to the longitudinal direction of the second section.

According to an embodiment, the first and second waveguides are configured to guide a given optical mode, the minimum cross-section having dimensions such that, in a plane comprising the minimum cross-section, effective optical indexes of the optical mode in the first and second waveguides are equal, to within more or less 0.1.

According to an embodiment, at least along the entire length of the first section, the outer lateral edge of the strip follows a circle and the inner lateral edge of the strip follows an ellipse concentric with the circle.

According to an embodiment, at the level of the minimum cross-section, the distance between the first and second sections is shorter than 150 nm.

According to an embodiment, beyond the first section, the outer edge, the inner edge, or each of the outer and inner edges of a longitudinal portion of the strip is bordered with a silicon slab.

According to an embodiment, the slab bordering the inner lateral edge of the portion of the strip is doped with a first conductivity type and the slab bordering the outer lateral edge of the portion of the strip is doped with a second conductivity type, the portion of the strip being: non-doped; or successively doped with the first conductivity type on the side of the doped slab of the first conductivity type, non-doped, and doped with the second conductivity type on the side of the doped slab of the second conductivity type; or successively doped with the first conductivity type on the side of the doped slab of the first conductivity type and doped with the second conductivity type on the side of the doped slab of the second conductivity type.

According to an embodiment, the portion of the strip comprises, lengthwise, a first doped region of a first conductivity type and a second doped region of a second conductivity type, possibly separated from each other by a non-doped region of the portion of the strip, the first and second regions continuing in the slab bordering the portion of the strip, preferably arranged on the side of the inner edge of the portion of the strip.

According to an embodiment, the device further comprises a third silicon waveguide optically coupled to the second waveguide.

According to a second embodiment, the third waveguide is annular and comprises a third section, the device further comprising a fourth silicon nitride waveguide comprising a fourth section, the third section running under the fourth section, and the third waveguide comprising an annular silicon strip having a cross-section increasing in the third section from a minimum cross-section located under the fourth section.

According to an embodiment, the third waveguide is annular, the device further comprising a fourth silicon waveguide optically coupled to the third waveguide.

According to an embodiment, the device further comprises a third silicon nitride waveguide, a third section of the second waveguide running under a fourth section of the third waveguide, the cross-section of the annular strip increasing in the third section from a minimum cross-section located under the fourth section.

According to an embodiment, each silicon waveguide is defined in an SOI-type layer, each silicon nitride waveguide being embedded in insulating layers of an interconnection structure located above the SOI-type layer.

Another embodiment provides an electro-optical modulator or an electro-optical switch comprising at least one device such as defined hereinabove.

According to an embodiment, the modulator comprises a first device such as defined hereinabove and a second device such as defined hereinabove, the first waveguide being common to the first and second devices and being configured to guide a fundamental transverse electric optical mode and a fundamental transverse magnetic mode of a signal, the first device being adapted to the fundamental transverse electric mode of the signal and the second device being adapted to the fundamental transverse magnetic mode of the signal.

The foregoing and other features and advantages will be discussed in detail in the following non-limiting description of specific embodiments in connection with the accompanying drawings.

BRIEF DESCRIPTION OF THE DRAWINGS

FIG. 2, which includes

FIG. 4, which includes

FIG. 6, which includes

FIG. 7, which includes

DETAILED DESCRIPTION OF ILLUSTRATIVE EMBODIMENTS

Figure 1:
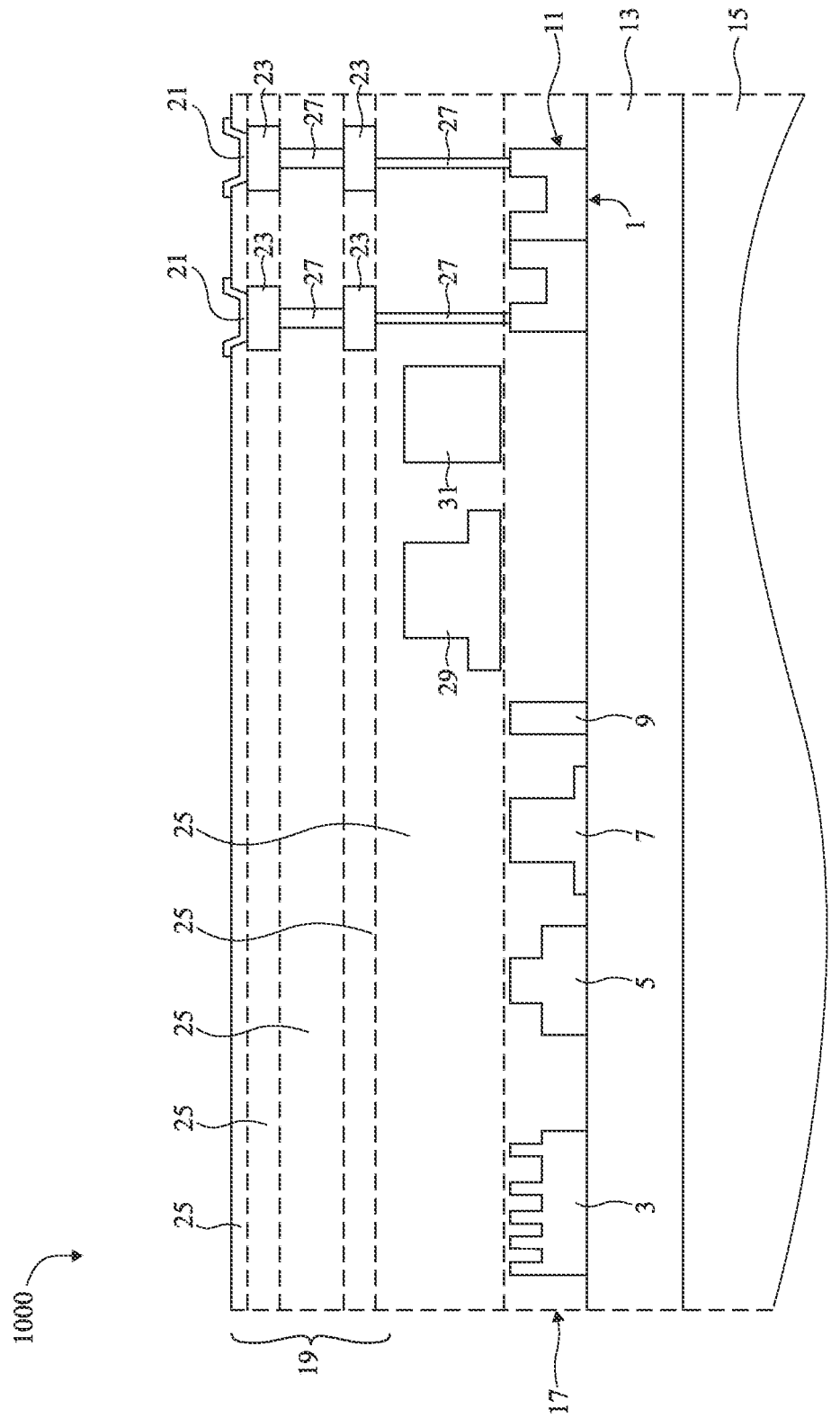
FIG. 1 is a simplified cross-section view of an example of a photonic integrated circuit of the type to which the described embodiments apply.

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed. In particular, the various usual integrated electro-optical devices where a resonant ring is implemented have not been detailed, the described embodiments being compatible with such usual devices.

Throughout the present disclosure, the term (electrically or optically) "connected" is used to designate a direct electrical or optical connection between circuit elements, whereas the term (electrically or optically) "linked" is used to designate an electrical or optical connection between circuit elements that may be direct, or may be via one or more other elements. Further, when reference has been made with no other mention to two elements linked or connected together, this means that the two elements are optically coupled or connected.

Unless otherwise specified, when reference is made to two waveguides coupled together, this means that the waveguides comprise portions sufficiently close to each other for at least part of the optical power of a signal to pass from one waveguide to the other by evanescent coupling or near field coupling.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., unless otherwise specified, it is referred to the orientation of the drawings.

In the following description, when reference is made to a cross-section of a waveguide, the cross-section is orthogonal to the longitudinal direction of the waveguide or, in other words, to the direction of propagation of an optical signal in the waveguide.

The terms "about", "substantially", "approximately", and "in the order of" are used herein to designate a tolerance of plus or minus 10%, preferably of plus or minus 5%, of the value in question.

FIG. 1 is a partial simplified cross-section view of an example of integrated photonic circuit 1000 of the type to which the described embodiments apply, it being understood that the embodiments which will be described hereafter are not limited to this specific example of a circuit.

Integrated photonic circuit 1000 comprises various optoelectronic and/or optical components, for example, a phase modulator 1, a coupling grating 3, and three waveguides 5, 7, and 9. The components are formed from a silicon layer 11 of SOI type laid on an insulating layer 13, preferably made of silicon oxide, arranged on a support 15 such as a silicon substrate. Components 1, 3, 5, 7, and 9 defined inside and/or on top of layer 11 rest on insulating layer 13 and are covered with an insulating layer 17. Layers 13 and 17 thus form an optical sheath having a lower refraction index than that of the silicon for these components, particularly the waveguides. The upper level of layer 17 may be confounded with that of silicon layer 11 or may be above the upper level of silicon layer 11.

In the example of FIG. 1, waveguides 5, 7, and 9 have cross-sections of different shapes. More particularly, waveguide 9 corresponds to a silicon strip having a rectangular cross-section, such a waveguide being of the type with no slab or rectangular ("strip"). Waveguides 5 and 7 each correspond to a silicon strip having a rectangular cross-section and laterally bordered along its length with silicon slabs, such waveguides being of rib type. Preferably, the height or thickness of the slabs is smaller than or equal to approximately half that of the silicon strip. More particularly, as is the case for waveguide 7 in this example, when the thickness of the slabs is smaller than approximately one third, preferably smaller than on third, of the thickness of the silicon strip, the slabs are called thin and the waveguide is said to be of deep rib type. The presence of slabs along the strip of a waveguide enables to decreases propagation losses in the waveguide. Losses are lower with thick slabs than with thin slabs, as a counterpart for the confinement of the optical signal in the waveguide, and more particularly in the waveguide strip. There is less confinement with thick slabs than with thin slabs.

An interconnection structure 19 rests on layer 17 to electrically link components of the circuit to one another and/or to contact pads 21, for example, arranged at the level of the upper surface of interconnection structure 19. Interconnection structure 19 comprises portions 23 of metal layers separated by insulating layers 25, and metal vias 27 crossing insulating layers 25 to electrically link portions 23 to one another and/or to components of the integrated circuit and/or to contact pads 21. Each metallization level comprises the portions 23 of a same metal layer, it being understood that a metal layer may here correspond to a stack of a plurality of metal layers, for example, made of different materials. In this example, interconnection structure 19 comprises two metallization levels.

One or a plurality of silicon nitride waveguides, here two waveguides 29 and 31, are located in interconnection structure 19, embedded in insulating layers 25, for example, made of silicon oxide. Preferably, silicon nitride waveguides 29 and 31 are arranged in layer 25 located between components 1, 3, 5, 7, and 9 (layer 11) and the lower metallization level of the interconnection structure, that is, the metallization level closest to these components.

In the example of FIG. 1, waveguides 29 and 31 have cross-sections of different shapes, waveguide 29 being of deep rib type and waveguide 31 being of the type comprising no slab or rectangular ("strip"). Although this is not shown herein, the circuit may also comprise one or a plurality of silicon nitride waveguides of rib type, embedded in the same layer 25 as waveguides 29 and 31.

Figure 2A:
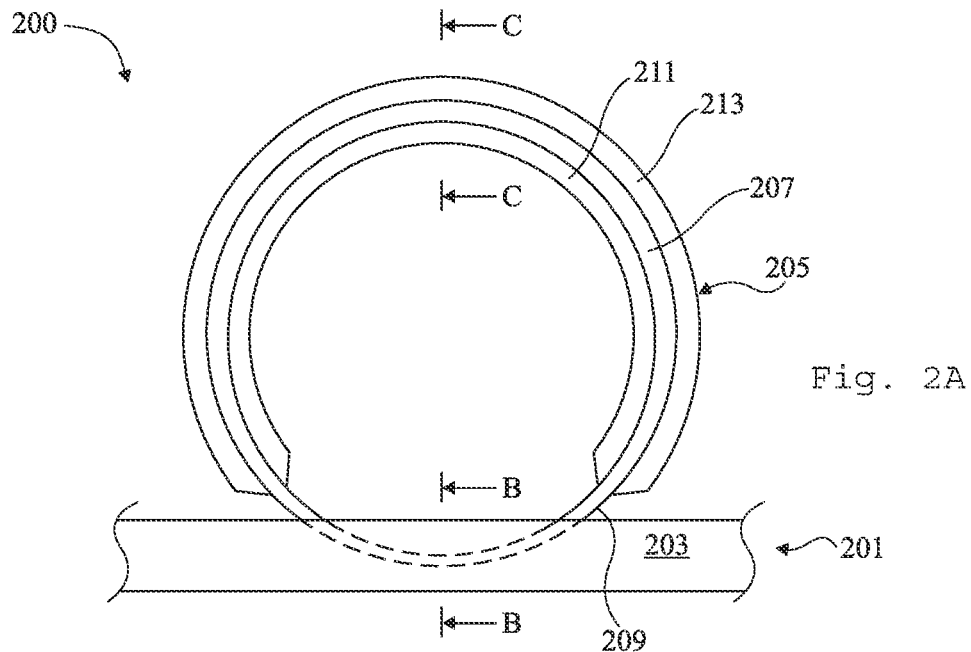
FIGS. 2A, 2B and 2C, shows of an embodiment of a ring resonator electro-optical device.
Figure 2B:
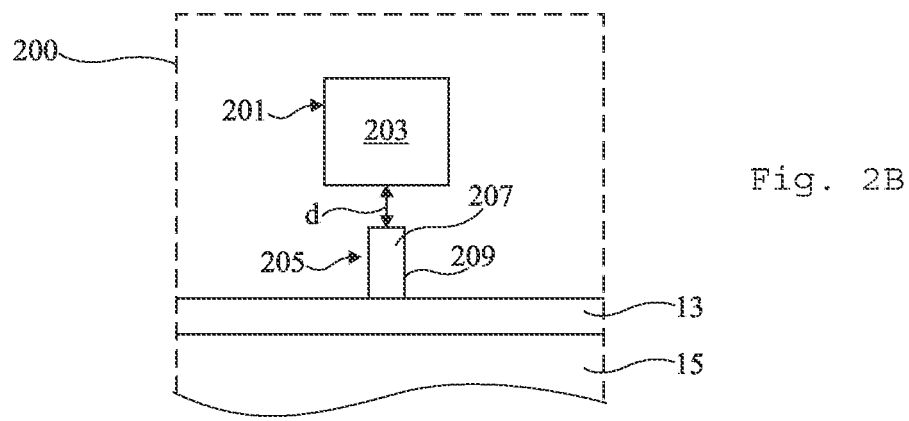
Figure 2C:
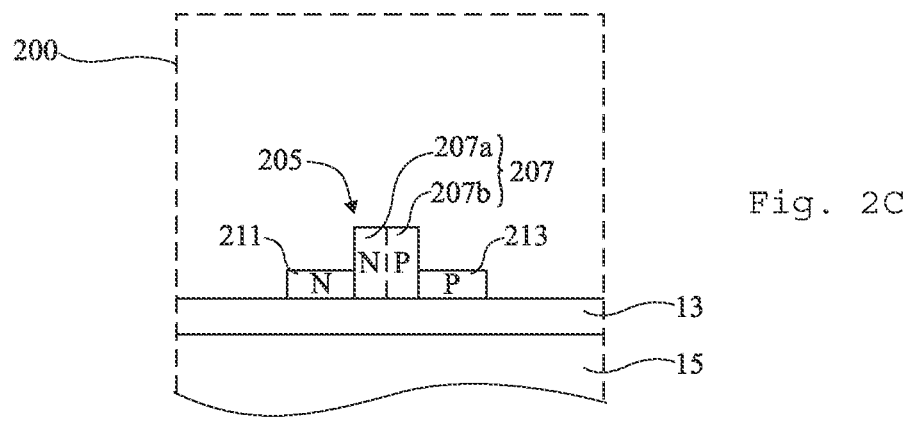

FIG. 2 schematically shows three views A, B, and C of an embodiment of an electro-optical device with a ring resonator 200, here, a modulator. View A is a top view, views B and C being cross-section views along respective planes BB and CC of view A. In this drawing, at least certain insulating layers where waveguides of the device are embedded have not been detailed. As an example, it is here considered that device 200 is adapted to the fundamental transverse electric mode of an optical signal having a wavelength equal to 1,310 nm.

Device 200 comprises a silicon nitride waveguide 201. Preferably, waveguide 201 is located in interconnection structure 19 of the circuit of FIG. 1, preferably in the same insulating layer 25 (not detailed in FIG. 2) as waveguides 29 and 31. In this example, only a longitudinal section 203 of waveguide 201, that is, a portion of the length of waveguide 201, is shown, section 203 being preferably rectilinear as in view A of FIG. 2.

Preferably, section 203 is of strip type and has a rectangular cross-section having dimensions which are preferably constant along the entire length of section 203. Preferably, the dimensions are determined to limit propagation losses in waveguide 201.

As an example, for the fundamental transverse electric mode of the signal considered herein, the cross-section of section 203 has a height in the order of 600 nm, for example, equal to 600 nm, for a width in the order of 800 nm, for example, equal to 800 nm. In this example, the effective optical index of the fundamental transverse electric mode is then substantially equal to 1.68, the optical index of an optical mode being defined as the ratio of the propagation constant of this optical mode to the wave vector in vacuum at the considered wavelength.

Device 200 further comprises an annular silicon waveguide 205, that is a waveguide closed on itself, forming a resonant ring of device 200. In this example, waveguide 205 has, in top view, the shape of a circle.

Waveguide 205 is arranged at a level lower than the level at which waveguide 201 is arranged. In other words, the upper level of waveguide 205 is lower than the lower level of waveguide 201. Preferably, waveguide 205 is defined in the SOI-type silicon layer 11 of the circuit of FIG. 1, waveguide 205 then resting on layer 13 and being covered with insulating layer 17 (not detailed in FIG. 1).

Waveguide 205 comprises a silicon strip 207. Waveguide 205 comprises a section 209, that is, a portion of the length of waveguide 205, which runs under section 203 of waveguide 201. In other words, as shown in view A, in top view, section 209 successively comprises, lengthwise, an upstream portion, an intermediate portion (in dotted lines in view A), and a downstream portion, the intermediate portion being entirely arranged under and opposite section 203 of waveguide 201. Preferably, section 209 is of strip type.

In section 209, the cross-section of strip 207 of waveguide 205 increases from a minimum cross-section located under section 203 of waveguide 201. In this example, only the width of the cross-section of strip 207 increases, its height being constant along the entire length of section 209. Preferably, the minimum cross-section of strip 207 in section 209 is located in the same plane as a cross-section of section 203 of waveguide 201. In other words, in section 209, the minimum cross-section of strip 207 is located in a plane orthogonal or substantially orthogonal to the longitudinal direction of section 203 of waveguide 201.

The dimensions of the minimum cross-section of strip 207 in section 209 are selected so that, for the optical mode and the signal to which device 200 is adapted, at the level of the minimum cross-section of section 209 (for example, in the plane comprising such a minimum cross-section), the effective optical index of waveguide 205, is preferably equal, to within 0.1, to the effective optical index of waveguide 201. As an example, for the fundamental transverse electric mode of the signal considered herein, the width of the minimum cross-section is for example equal to 190 nm, for a 300-nm height, which corresponds to an effective optical index equal to 1.69 in waveguide 205.

Further, distance d separating section 203 from section 209 is sufficiently short for an optical coupling to be established between sections 203 and 209. As an example, distance d is shorter than 150 nm, for example, in the range from 100 to 150 nm in this example.

Thus, when an optical signal adapted to device 200 (in this example, the fundamental transverse electric mode of a signal having a 1,310-nm wavelength) propagates in section 203 of waveguide 201, a portion of the signal, that is, of the optical power of the signal, runs by evanescent coupling in section 209 of waveguide 205.

The coupling between sections 203 and 209 is called "directional" due to the fact that less than 30%, preferably less than 20%, of the optical power of the signal passes by coupling of section 203 to section 209. In other words, the coupling coefficient between sections 203 and 209 is smaller than 0.3, preferably smaller than 0.2. The coupling coefficient may for example be determined by simulation, by opening annular waveguide 205, and by measuring the optical power supplied by the end of waveguide 205 at the level of the opening. As an example, in device 200, the percentage of optical power of the signal which passes by coupling of section 203 to section 209 is such that it enables to compensate for the propagation losses in waveguide 205.

Device 200 further comprises a modulator for modulating the effective index of waveguide 205, preferably beyond section 209. As an example, the modulator corresponds to a PN diode having its junction at least partly arranged in strip 207 of waveguide 205, preferably beyond section 209, or to a PiN diode having its intrinsic region, here corresponding to the diode junction, at least partly arranged in strip 207 of waveguide 205, preferably beyond section 209. Thus, the resonance wavelength of ring 205 is adjustable to be selectively equal or not to the wavelength of the signal propagating through device 200. Device 200 then enables to modulate the optical power of the signal propagating from one end to the other of section 203 of waveguide 201.

More particularly, in the embodiment of FIG. 2, beyond section 209, waveguide 205 is of rib type, for example, of "deep rib" type, a silicon slab 211 bordering the inner lateral edge of strip 207 and a silicon slab 213 bordering the outer lateral edge of strip 207. Slab 211 is doped with a first conductivity type, for example, type N, slab 213 being doped with the opposite conductivity type, for example, type P. Further, between slabs 211 and 213, strip 207 successively comprises a doped region 207a of the first conductivity type, located on the side of slab 211 and in contact therewith, and a doped region 207b of the second conductivity type, located on the side of slab 213 and in contact therewith. Regions 207a and 207b are in contact with each other, thus forming a PN diode having its junction (in dotted lines in view C) located in strip 207. Preferably, the diode junction is located at approximately the same distance from each of the lateral edges of strip 207, which results in a better modulation efficiency. Although this has not been shown, slabs 211 and 213 are electrically connected to two respective terminals of application of a voltage for biasing the PN diode. The modification of the bias voltage of the diode enables to modify or to modulate the effective optical index of waveguide 205, and thus is resonance wavelength.

Preferably, the transition of strip section 209 to a rib section is progressive, for example, by progressive increase of the width and/or of the thickness of the slabs from section 209, so that the effective optical index of the considered signal varies progressively. As is the case in the present example, the progressive effective optical index variation may also result from the fact that the cross-section of strip 207, here its width, progressively increases from section 209 to a maximum cross-section, in the present example the constant cross-section of strip 207 in a section of waveguide 205 arranged beyond section 209. Preferably, the dimensions of the maximum cross-section are determined to minimize propagation losses for the signal to which the device is adapted. As an example, for the signal considered herein, the maximum cross-section of strip 207 of waveguide 205 has a height or a thickness in the order of 300 nm, preferably 300 nm, and a width in the order of 320 nm, preferably 320 nm.

In the specific example shown herein where the waveguide 205 has the shape of a circle, the variation of the cross-section of strip 207 preferably results from the fact that, along the portion of strip 207 with a variable cross-section, one of the inner and outer edges of the strip follows the shape of a circle, the other edge following the shape of an ellipse concentric with the circle. Preferably, the outer edge of the strip follows the shape of a circle, which enables to decrease propagation losses in annular waveguide 205 with respect to the case where the inner edge of the strip would have followed the shape of a circle. Indeed, a decrease of the radius of curvature of the outer edge of the strip causes greater propagation losses by radiation than when the radius of curvature of the outer edge of the strip is constant.

Figure 3:
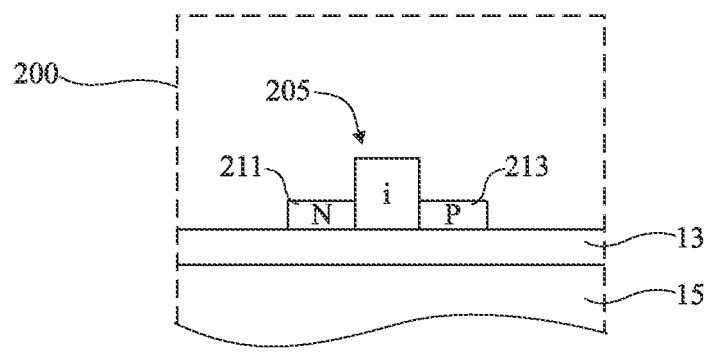
FIG. 3 is a cross-section view illustrating an alternative embodiment of the device of FIG. 2.

FIG. 3 is a cross-section view illustrating an alternative embodiment of the device of FIG. 2, and more particularly an alternative embodiment of the modulator that modulates the effective optical index of waveguide 205. Such a modulator here corresponds to a PiN diode. The cross-section view of FIG. 3 corresponds to view C of FIG. 2.

In this variation, device 200 of FIG. 3 differs from that of FIG. 2 in that strip 207 is not doped and forms the intrinsic region (i) of the PiN diode having its anode and its cathode respectively corresponding to slabs 211 and 213 in the shown example.

In another variation, not shown, strip 207 successively comprises, between slabs 211 and 213:
 a doped region of the same conductivity type as slab 211, arranged on the side of slab 211 and in contact therewith,
 a doped region of the same conductivity type as slab 213, arranged on the side of slab 213 and in contact therewith, and
 a non-doped or intrinsic region interposed between the two doped regions, the intrinsic region forming the intrinsic region of the PiN diode. Preferably, the intrinsic region is then located approximately at the same distance from each of the inner and outer lateral edges of strip 207.

In these variations and in the embodiment of FIG. 2, the junction of the PN diode or of the PiN diode extends substantially parallel, preferably parallel, to one of the inner and outer lateral edges of strip 207.

Figure 4A:
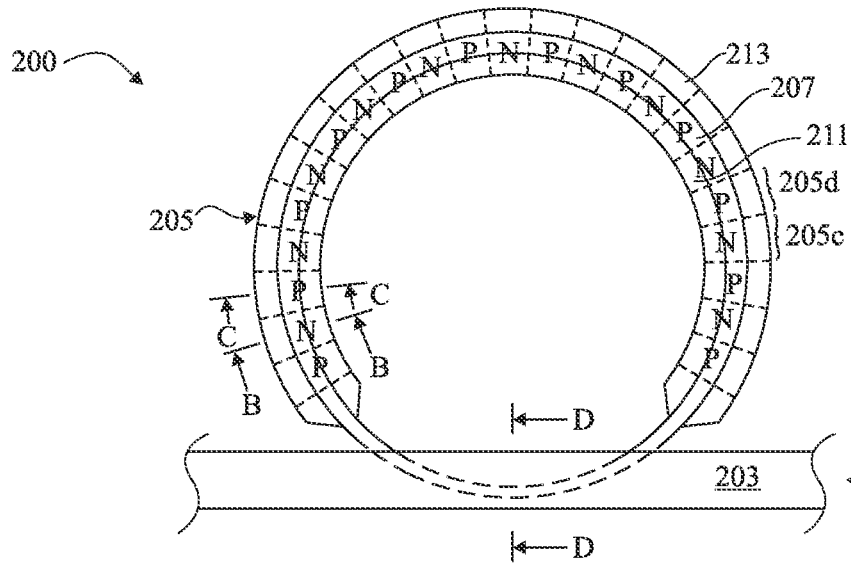
FIGS. 4A, 4B, and 4C, illustrates another alternative embodiment of the device of FIG. 2.
Figure 4B:
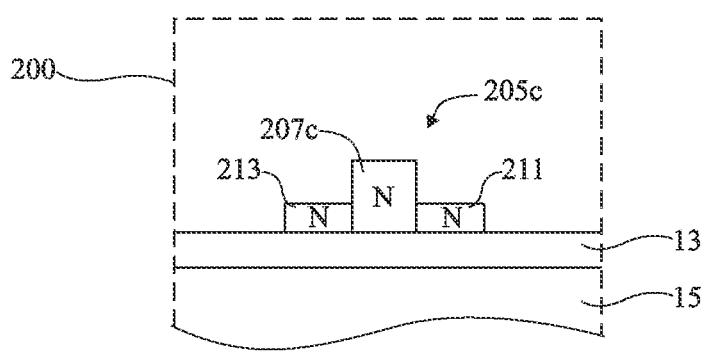
Figure 4C:
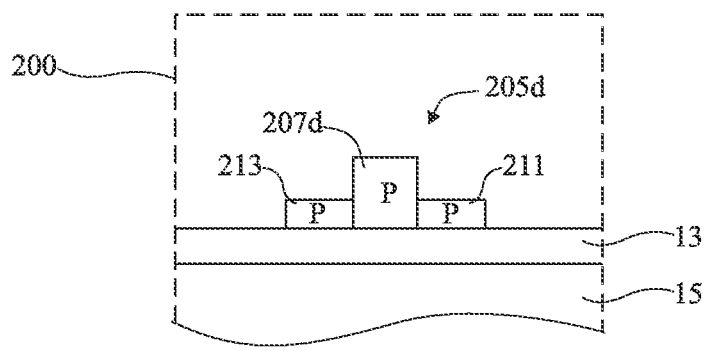

FIG. 4 shows three views A, B, and C illustrating another alternative embodiment of the device of FIG. 2, and more particularly an alternative embodiment of a modulation element for modulating the effective optical index of waveguide 205. View A is a top view of device 200, views B and C being cross-section views along respective planes BB and CC of view A of FIG. 4. The view corresponding to cross-section plane DD of FIG. 4 has not been shown and is identical to view B of FIG. 2.

Device 200 of FIG. 4 differs from that of FIG. 2 by the way in which slabs 211 and 213 and strip 207 of waveguide 205 are doped. In this variation, waveguide 205 comprises, lengthwise and preferably beyond section 209, a doped section 205c of a first conductivity type, for example, type N, and a doped section 205d of the second conductivity type, for example, type P. The two sections are in contact with each other to form a PN diode having its junction partly located in strip 207. More particularly, in the shown example, the waveguide comprises, lengthwise, an alternation of sections 205c and 205d in contact two by two (delimited by dotted lines in view A), thus forming a plurality of PN diodes. A bias voltage may be applied to each PN diode via each P-type doped portion of slabs 211 and 213 and of each N-type doped portion of slabs 211 and 213.

In other words, strip 207 comprises, lengthwise, a first doped region or section 207c (view B) of a first conductivity type, for example, type N, and a second doped region or section 207d (view C) of a second conductivity type, for example, type P, in contact with each other and, more particularly in the shown example, an alternation of regions 207c and 207d in contact two by two. Each region 207c and 207d continues in a contiguous portion of each slab 211 and 213.

In a variation, not illustrated, of the device of FIG. 4, only the inner edge or the outer edge of strip 205 is bordered with slab 211 or 213. Preferably, only the inner edge of strip 205 is bordered with slab 213, which enables to decrease propagation losses in annular waveguide 205 with respect to the case where only the outer edge is bordered with slab 211 or with respect to the case where the outer and inner edges of the strip are each bordered with a corresponding slab 211 or 213.

In an alternative embodiment, not illustrated, a non-doped section of waveguide 205 is interposed between each two neighboring sections 205c and 205d so that the modulation element corresponds to a PiN diode rather than to a PN diode. In other words, each region 207c is separated from its neighboring region(s) 207d by a non-doped region of strip 207.

Figure 5:
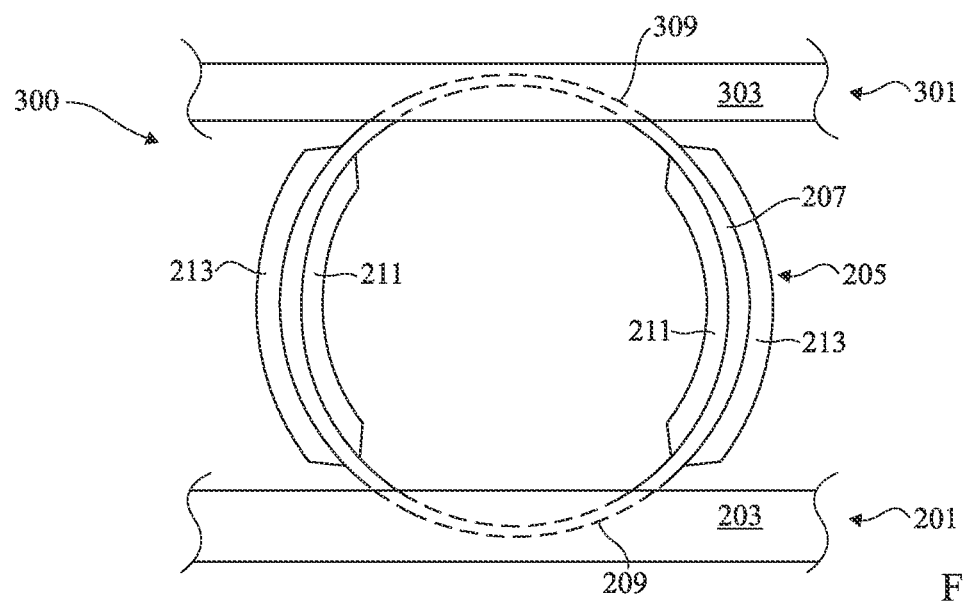
FIG. 5 illustrates another embodiment of a ring resonator electro-optical device.

FIG. 5 illustrates another embodiment of a ring resonator electric-optical device 300. FIG. 5 is a top view of device 300. Only the differences between device 300 and device 200 of FIG. 2 are detailed.

As compared with device 200, device 300 comprises another silicon nitride waveguide 301. Waveguide 301 is located in the same level as waveguide 201, for example, in interconnection structure 19 of the circuit of FIG. 1, preferably in the same insulating layer 25 as waveguides 29 and 31. In this example, only a section 303 of waveguide 301 is shown, section 303 being preferably rectilinear and parallel to section 203 of waveguide 201. Preferably, section 303 is of strip type and has a rectangular cross-section having dimensions preferably constant along its entire length. Preferably, such dimensions are determined to limit propagation losses in waveguide 201 and are preferably equal or substantially equal to those of the cross-section of section 203 of waveguide 201.

In this embodiment, waveguide 205 comprises a section 309, preferably of strip type, running under section 303 of waveguide 301. In section 309, the cross-section of strip 207 increases from a minimum cross-section located under section 303 of waveguide 301. The dimensions of the minimum cross-section of strip 207 in section 309 are determined in the same way as the dimensions of the minimum cross-section of strip 207 in section 209, the two minimum cross-sections preferably having the same dimensions. Further, the layout of the minimum cross-section of strip 207 in section 309 with respect to waveguide 301 is identical to the layout of the minimum cross-section of strip 207 in section 209 with respect to waveguide 201.

Further, in the embodiment of FIG. 5, preferably between sections 209 and 309, waveguide 205 is of rib type, the modulation element for modulating the effective optical index of waveguide 205 being then provided in a section of waveguide 205 provided with the slabs.

In operation, when an adapted signal is injected at one end of section 203 of waveguide 201 (in this example, on the left-hand side of FIG. 5), if the modulation element for the effective optical index of waveguide 205 is controlled so that its resonance wavelength is equal to the wavelength of the signal, a signal corresponding to the injected signal is available at one end of section 303 of waveguide 301 (in this example, on the left-hand side of FIG. 5). However, if the element for modulating the effective optical index of waveguide 205 is controlled so that its resonance wavelength is different from the wavelength of the signal, a signal corresponding to the injected signal is available at the other end of section 203 of waveguide 201 (in the present example, on the right-hand side of FIG. 5).

Device 300 thus forms a switch enabling to transmit a signal injected at one end of section 209 towards the other end of the section or towards an end of section 309 of waveguide 301.

The alternative embodiments described in relation with FIGS. 2 to 4 apply to the embodiment of FIG. 5.

Figure 6A:
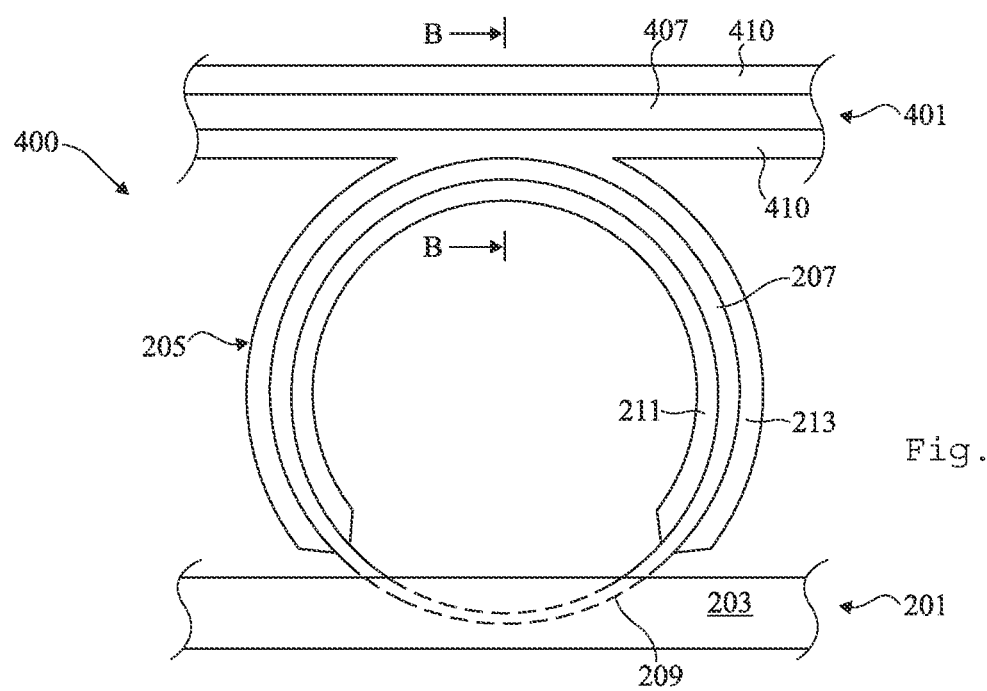
FIGS. 6A and 6B, illustrates another embodiment of a ring resonator electro-optical device.
Figure 6B:
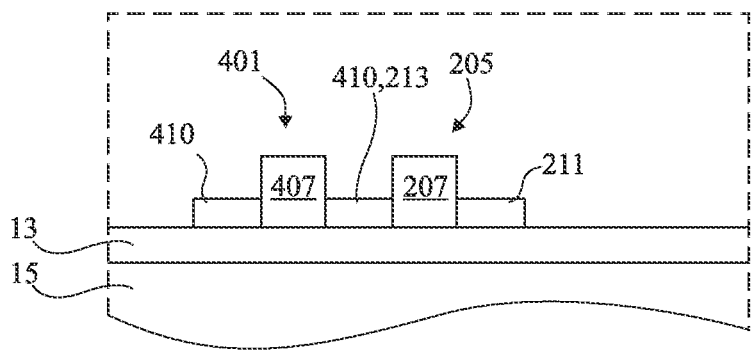

FIG. 6 show two views A and B illustrating another embodiment of a ring resonator electro-optical device 400. Only the differences between device 400 and device 200 of FIG. 2 are detailed.

As compared with the device of FIG. 200, device 400 comprises another silicon waveguide 401. Waveguide 401 is located at the same level as waveguide 205. In this example, only a longitudinal section of waveguide 401 is shown, the section being preferably rectilinear and its longitudinal direction being preferably parallel to that of section 203 of waveguide 201. Waveguide 401 comprises a silicon strip 407 having a preferably constant cross-section, for example, determined to minimize propagation losses in waveguide 401. This section of waveguide 401 is arranged at a distance from waveguide 205 which is sufficiently short to optically couple waveguides 205 and 401. Preferably, the element for modulating the effective optical index of waveguide 205 is provided beyond the section of waveguide 205 which is optically coupled to waveguide 401.

In this example, waveguide 401 is of rib type, preferably of deep rib type, and each lateral edge of strip 407 is bordered with a silicon slab 410. The slab 410 on the side of waveguide 205 may have a common portion with slab 213 as shown in view B of FIG. 6, slab 213 being preferably non-doped at the level of the common portion.

In an alternative embodiment, not shown, waveguide 401 is of strip type, and slab 213 may be interrupted at the level of a portion of strip 407 optically coupled with waveguide 205.

The operation of device or switch 400 is similar to that of device 300.

The alternative embodiments described in relation with FIGS. 2 to 4 apply to the embodiment and to the alternative embodiment described hereinabove in relation with FIG. 6.

Figure 7A:
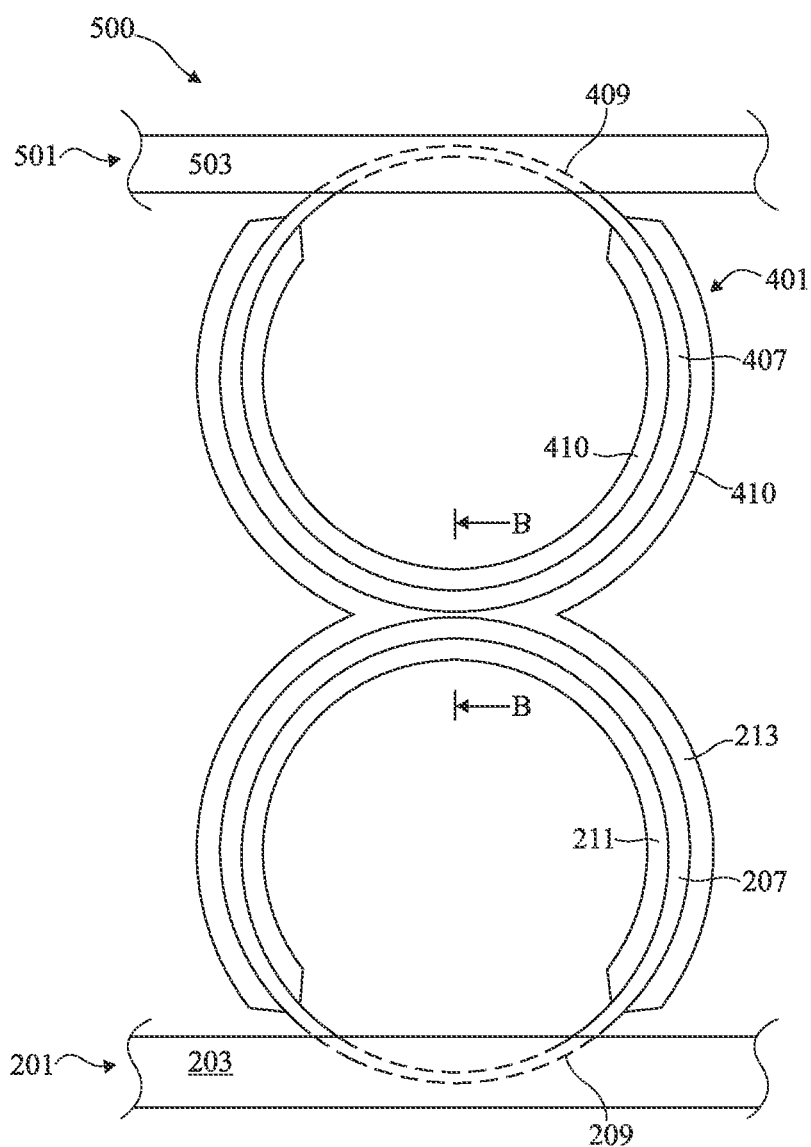
FIGS. 7A and 7B, illustrates another embodiment of a ring resonator electro-optical device.
Figure 7B:
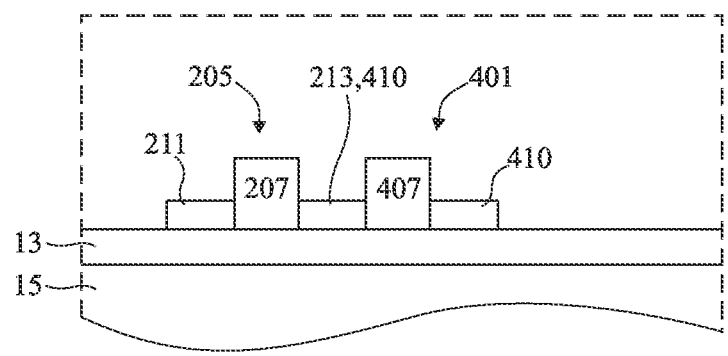

FIG. 7 illustrates another embodiment of a ring resonator electro-optical device 500, FIG. 7 being a top view of the device. Only the differences between device 500 and device 400 are detailed.

As compared with device 400, waveguide 401 of device 500 is annular and forms a second resonant ring of device 500. Waveguide 401 is similar, or even identical, to waveguide 205 and is preferably provided with the same modulation element as waveguide 205.

Device 500 further comprises a silicon nitride waveguide 501, similar or identical to waveguide 201, only a section 503 thereof being shown in FIG. 7. Preferably, section 503 is rectilinear and parallel to section 203. Waveguide 401 comprises a section 409 running under section 503, similarly to what has been described for sections 209 and 203. In section 409, the cross-section of strip 407 of waveguide 401 increases from a minimum cross-section located under section 503 of waveguide 501, similarly to what has been previously described for sections 203 and 209.

The operation of device or switch 500 is similar to those of devices 300 and 400. However, due to the fact that device 500 comprises two resonant rings coupled to each other, its bandwidth and the attenuation of a signal outside of the bandwidth are larger than in the case of a device comprising a single resonant ring, for example, devices 300 and 400.

In an alternative embodiment, not shown, waveguide 501 is made of silicon, for example, similar or identical to waveguide 401 described in relation with FIG. 6, and is optically coupled to annular waveguide 401 in the same way as described for waveguides 205 and 401 of FIG. 6. In this variation, strip 407 of annular waveguide 401 preferably has a constant cross-section, for example determined to minimize propagation losses in waveguide 401, preferably equal to the constant cross-section of waveguide 401 described in relation with FIG. 6.

Further, the variations described in relation with FIGS. 2 to 5 apply to the embodiment and to the alternative embodiment described hereinabove in relation with FIG. 7.

Figure 8:
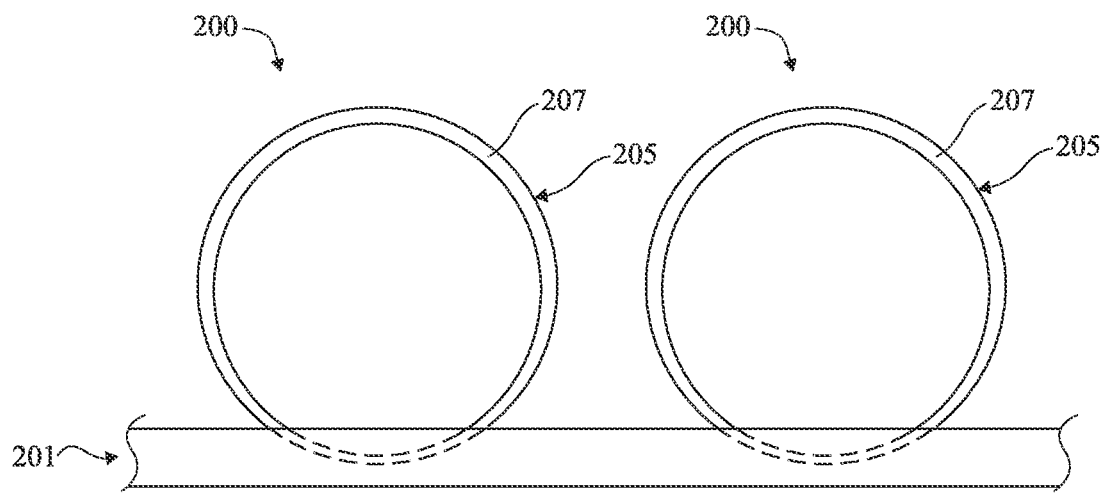
FIG. 8 illustrates another embodiment of a ring resonator electro-optical device.

FIG. 8 is a very simplified top view illustrating an example of a device boo comprising two devices 200. In this drawing, the slabs of waveguides 205 and the element for modulating the effective optical index of waveguides 205 have not been shown, and such modulator may correspond to those described in relation with any of FIGS. 2 to 5.

In device 600, devices 200 share the same waveguide 201. Further, for a signal at a given wavelength, for example, approximately 1,310 nm, preferably 1,310 nm, waveguide 201, and more particularly the dimensions of its cross-section, here constant, are configured so that the effective optical index of the fundamental transverse electric mode and of the fundamental transverse magnetic mode of the signal are substantially equal, for example, equal to approximately 1.68 in this example.

First device 200 is adapted to the fundamental transverse electric mode of the signal. In other words, in the first device, the minimum cross-section of strip 207 arranged under waveguide 201 has dimensions such that, in the plane comprising such a minimum cross-section, the effective optical index of the fundamental transverse electric mode is identical, to within 0.1, in waveguide 205 of the first device and in waveguide 201. Further, second device 200 is adapted to the fundamental transverse magnetic mode of the signal. In other words, in the second device, the minimum cross-section of strip 207 arranged under waveguide 201 has dimensions such that, in the plane comprising such a minimum cross-section, the effective optical index of the fundamental transverse electric mode is identical, to within 0.1, in waveguide 205 of the second device and in waveguide 201. In other words, the waveguide 205 of the first device 200 is adapted to the fundamental transverse electric mode of the signal, the waveguide 205 of the second device 200 being adapted to the fundamental transverse magnetic mode of the signal, and the waveguide 201 common to the two devices 200 being adapted to the fundamental transverse electric mode and to the fundamental transverse magnetic mode of the signal. The minimum cross-section of waveguide 205 of the first device 200 is then different from that of the waveguide 205 of the second device 200.

Thus, when the fundamental transverse magnetic and transverse electric modes of a signal are injected into waveguide 201, each of the fundamental transverse magnetic and transverse electric modes is modulated independently with respect to the other mode, by the device 200 adapted to this mode.

The different embodiments and the different alternative embodiments described in relation with FIGS. 2 to 7 apply to the embodiment of FIG. 8.

To modulate a signal propagating in a silicon nitride waveguide by a resonant silicon ring, it could have been devised to use an additional silicon waveguide comprising an upstream portion coupled to the nitride waveguide to transmit the signal to be modulated from the nitride waveguide towards the additional silicon waveguide, an intermediate portion usually coupled to the resonant silicon ring to modulate the signal, and a downstream portion coupled to the nitride waveguide to transmit the modulated signal from the additional silicon waveguide to the nitride waveguide. However, a coupling coefficient equal or almost equal to 1 between the nitride waveguide and each of the upstream and downstream portions of the additional silicon waveguide would then have been necessary. The distance over which the nitride waveguide and the downstream or upstream portion would have been coupled would then have been greater than approximately 100 µm, resulting in a device much more bulky than the devices of the embodiments and variations described hereinabove where the nitride waveguide is directly coupled to the annular silicon waveguide. This is made possible particularly due to the fact that a coupling coefficient smaller than 0.3 between waveguides 201 and 205 is sufficient.

To modulate a signal propagating in a silicon nitride waveguide by a resonant silicon ring, it could have been devised to use an annular silicon waveguide with a constant cross-section along its entire length, while providing for such a constant cross-section to have dimensions such that the optical index of the silicon and nitride waveguides is equal, to within 0.1, for the considered optical mode. In other words, the dimensions of the constant cross-section of the annular silicon waveguide would have been those of the minimum cross-sections described hereinabove. However, the propagation losses in the annular silicon waveguide with a constant cross-section would then have been greater than the propagation losses in the annular silicon waveguides of the above-described devices.

Further, the in above embodiments, rather than varying the cross-section of the silicon waveguide to obtain a matching of effective optical indexes between waveguides 205 and 201, it could have been devised to vary the cross-section of section 203 of waveguide 201, the cross-section of section 209 of waveguide 205 remaining substantially constant and being for example determined to minimize propagation losses. However, section 203 would then have had dimensions such that optical modes of higher orders could have propagated and have been guided into waveguide 201, which is not desirable.

The devices of the embodiments and variations described hereinabove enable to use silicon waveguides arranged at a first level and of silicon nitride waveguides arranged at a second level, which enables the crossing of waveguides on different levels.

Resonant ring electro-optical devices of the type of those described in relation with FIGS. 1 to 7 may be provided in many electro-optical devices, for example, switches, optical multiplexers and demultiplexers. In particular, devices of the type described in relation with FIGS. 5 to 7 may be provided in switches comprising a plurality of ring resonators optically coupled to one another by waveguides. In this case, due to the fact the silicon waveguides and nitride waveguides of the described devices are at different levels, in particular when they cross, the switches formed with such devices are simpler to design, and more compact.

Although the case of devices adapted to signals having a wavelength approximately equal to 1,310 nm, and more particularly to the fundamental transverse electric mode of these signals, has been considered in the above description, the devices may be adapted to other wavelengths and/or to other optical modes by modification of the dimensions of the cross-sections of the waveguides according to the wavelength and to the optical mode of the considered signal. As an example, the described devices may be adapted to an optical signal having its wavelength(s) in the near infrared range, and approximately in the range from 1 to 2 µm, preferably equal to approximately 1.3 µm or approximately 1.55 µm, for example to 1.3 µm or 1.55 µm, and/or having the fundamental transverse magnetic mode as an optical mode.

Further, although embodiments and variations where the element for modulating the effective optical index of the annular silicon waveguide(s) correspond to a PN diode or to a PiN diode have been described, other modulation elements can be envisaged. For example, a polarizable heterostructure comprising one or a plurality of quantum wells located in the annular waveguide may be used instead of diodes.

Further, although annular silicon guides having, in top view, a circular shape, have been described, other shapes of annular guides may be provided. For example, the annular silicon waveguide(s) may each have the shape of an oval or of an athletics track, that is, two half-circles connected to each other by two parallel rectilinear portions of the annular waveguide. In this last case, a minimum cross-section of the silicon annular waveguide may be provided, under a nitride waveguide, at the level of a rectilinear portion or curve of the annular waveguide having the shape of an athletics track.

Various embodiments and variations have been described. It will be understood by those skilled in the art that certain features of these various embodiments and variations may be combined, and other variations will occur to those skilled in the art.

Finally, the practical implementation of the described embodiments and variations is within the abilities of those skilled in the art based on the functional indications given hereinabove. In particular, the dimensions of the cross-sections of the waveguides described in relation with FIGS. 1 to 8 may be determined by those skilled in the art, particularly by means of simulation tools such as the tool designated by trade name Lumerical.

What is claimed is:

1. A ring resonator electro-optical device comprising:
a first annular silicon waveguide comprising a first annular silicon strip; and
a second silicon waveguide located at a same level of the device as the first annular silicon waveguide and comprises a second silicon strip arranged at a distance from the first annular silicon strip, wherein a first lateral edge of the second silicon strip is bordered by a first silicon slab and a second lateral edge of the second silicon strip is bordered by a second silicon slab.

2. The device of claim 1, wherein the second silicon strip has a constant cross-section.

3. The device of claim 1, wherein the first annular silicon waveguide is configured to have a shape of an oval or athletics track.

4. The device of claim 1, further comprising a first silicon nitride waveguide optically coupled to the first annular silicon waveguide, the first silicon nitride being arranged at a lower level of the device than the first annular silicon waveguide.

5. The device of claim 4, wherein a first section of the first annular silicon waveguide and a second section of the first silicon nitride waveguide overlap and a cross-section of the first annular silicon strip increases from a minimum cross-section located in a plane that is substantially orthogonal to a longitudinal direction of the second section.

6. The device of claim 5, wherein at least along an entire length of the first section an outer lateral edge of the first annular silicon strip follows a circle and an inner lateral edge of the first annular silicon strip follows an ellipse.

7. The device of claim 5, wherein, at a location of the minimum cross-section, a distance between the first section and the second section is shorter than 150 nm.

8. The device of claim 5, wherein beyond the first section, a third silicon slab borders an inner lateral edge or an outer lateral edge of a longitudinal portion of the first annular silicon strip, or the third silicon slab borders the inner lateral edge and a fourth silicon slab borders the outer lateral edge of the longitudinal portion of the first annular silicon strip.

9. The device of claim 5, wherein the first annular silicon waveguide and the first silicon nitride waveguide are configured to guide a given optical mode, the minimum cross-section having dimensions such that, in the plane comprising the minimum cross-section, effective optical indexes of the optical mode in the second and third waveguides are equal, to within more or less 0.1.

10. A ring resonator electro-optical device comprising:
a first annular silicon waveguide comprising a first annular silicon strip;
a second silicon waveguide located at a same level of the device of the first annular silicon strip, the second silicon waveguide comprising a second silicon strip;
a first silicon slab bordering an inner lateral edge of a longitudinal portion of the first annular silicon strip beyond a first section of the first annular silicon strip;
a second silicon slab bordering an outer lateral edge of the longitudinal portion of the first annular silicon strip beyond the first section of the first annular silicon strip;
a third silicon slab bordering an inner lateral edge of the second silicon strip; and
a fourth silicon slab bordering an outer lateral edge of the second silicon strip.

11. The device of claim 10, wherein the second silicon slab and the third silicon slab share a common portion.

12. The device of claim 11, wherein the common portion is undoped.

13. The device of claim 10, wherein the first silicon slab bordering the inner lateral edge of the longitudinal portion of the first annular silicon strip is doped with a first conductivity type and the second silicon slab bordering the outer lateral edge of the longitudinal portion of the first annular silicon strip is doped with a second conductivity type.

14. The device of claim 13, wherein the longitudinal portion of the first annular silicon strip is undoped.

15. The device of claim 13, wherein the longitudinal portion of the first annular silicon strip is successively doped with the first conductivity type on the side of the first silicon slab doped with the first conductivity type, non-doped, and doped with the second conductivity type on the side of the second silicon slab doped with the second conductivity type.

16. The device of claim 13, wherein the longitudinal portion of the first annular silicon strip is successively doped with the first conductivity type on the side of the first silicon slab doped with the first conductivity type and doped with the second conductivity type on the side of the second silicon slab doped with the second conductivity type.

17. The device of claim 10, wherein the longitudinal portion of the first annular silicon strip comprises, lengthwise, a first doped region of a first conductivity type and a second doped region of a second conductivity type.

18. The device of claim 17, wherein the first doped region is separated from the second doped region by a non-doped region of the longitudinal portion of the first annular silicon strip.

19. The device of claim 17, wherein the first and second regions continue in the first silicon slab bordering the portion of the first annular silicon strip, the first and second regions being arranged on the side of the inner lateral edge of the portion of the annular strip.

20. An optical device comprising:
a ring resonator electro-optical device that comprises:
a first silicon annular waveguide having an oval or athletic track shape; and
a second silicon waveguide located at a same level of the device as the first annular silicon waveguide, the second silicon waveguide comprising first silicon strip, wherein an inner lateral edge of the first silicon strip is bordered by a first silicon slab and an outer lateral edge of the first silicon strip is bordered by a second silicon slab.

21. The optical device of claim 20, wherein the first silicon annular waveguide comprises a second annular silicon strip, and the device further comprises a third silicon slab bordering an inner lateral edge of a longitudinal portion of the annular silicon strip beyond a first section of the second annular silicon strip, and a fourth silicon slab bordering an outer lateral edge of the longitudinal portion of the second annular silicon strip beyond the first section of the second annular silicon strip.

22. The optical device of claim 21, wherein the first silicon slab and the fourth silicon slab share an undoped common portion.

* * * * *